(12) United States Patent
Ba-Abbad et al.

(10) Patent No.: US 9,034,070 B2
(45) Date of Patent: May 19, 2015

(54) METHOD AND SYSTEM FOR TREATMENT OF BIOLOGICAL WASTES FOR PREPARATION OF FERTILIZERS

(71) Applicant: King Abdul Aziz City for Science and Technology (KACST), Riyadh (SA)

(72) Inventors: Mazen Abdullah Ba-Abbad, Riyadh (SA); Ali Abdullah A Aljaloud, Riyadh (SA); Ahmed Mohammed Alabdulkader, Riyadh (SA)

(73) Assignee: KING ABDULAZIZ CITY FOR SCIENCE AND TECHNOLOGY (KACST), Riyadh (SA)

( * ) Notice: Subject to any disclaimer, the term of this patent is extended or adjusted under 35 U.S.C. 154(b) by 26 days.

(21) Appl. No.: 13/895,312

(22) Filed: May 15, 2013

(65) Prior Publication Data

US 2014/0157844 A1    Jun. 12, 2014

Related U.S. Application Data

(63) Continuation of application No. 12/786,935, filed on May 25, 2010, now Pat. No. 8,460,426.

(51) Int. Cl.
| | |
|---|---|
| *C05D 9/02* | (2006.01) |
| *C05F 11/00* | (2006.01) |
| *C05F 3/00* | (2006.01) |
| *C05B 17/00* | (2006.01) |
| *C01C 1/08* | (2006.01) |
| *C05C 11/00* | (2006.01) |
| *C05F 5/00* | (2006.01) |
| *C05F 7/00* | (2006.01) |
| *C10B 53/02* | (2006.01) |
| *C10B 57/08* | (2006.01) |
| *C05F 17/00* | (2006.01) |
| *C05G 3/04* | (2006.01) |

(52) U.S. Cl.
CPC . *C05B 17/00* (2013.01); *C01C 1/08* (2013.01); *C05C 11/00* (2013.01); *C05F 3/00* (2013.01); *C05F 5/00* (2013.01); *C05F 7/00* (2013.01); *C10B 53/02* (2013.01); *C10B 57/08* (2013.01); *Y02E 50/14* (2013.01); *C05F 11/00* (2013.01); *C05F 17/0027* (2013.01); *C05G 3/04* (2013.01)

(58) Field of Classification Search
USPC ........................................................ 71/11–30
See application file for complete search history.

(56) References Cited

U.S. PATENT DOCUMENTS

| | | |
|---|---|---|
| 2010/0218573 A1 | 9/2010 | Van Slyke |
| 2011/0289991 A1 | 12/2011 | Ba-Abbad et al. |

*Primary Examiner* — Jennifer A Smith
(74) *Attorney, Agent, or Firm* — Timberline Patent Law Group PLLC

(57) ABSTRACT

A method and system for treatment of biological wastes for preparation of fertilizers is provided. The method and system involves mixing a biological waste with a dilute sulfuric acid in a predetermined ratio. The mixture of the biological waste and the dilute sulfuric acid is then filtered to obtain an organic slurry and an acidic liquid. Thereafter, the organic slurry is thermally cracked at an elevated temperature to obtain at least one of an ammonia gas, one or more flue gases, and char and ash. The method and system further involves utilizing the ammonia gas, the char and ash, and the acidic liquid for preparation of the fertilizers.

11 Claims, 4 Drawing Sheets

U.S. 9,034,070 B2

METHOD AND SYSTEM FOR TREATMENT OF BIOLOGICAL WASTES FOR PREPARATION OF FERTILIZERS

RELATED APPLICATIONS

This continuation application claims the benefit of priority to copending U.S. patent application Ser. No. 12/786,935 to Mazen Abdullah Ba-Abbad, filed May 25, 2010 and incorporated herein by reference, in its entirety.

FIELD OF THE INVENTION

The invention generally relates to treatment of biological wastes. More specifically, the invention relates to treatment of biological wastes for preparation of fertilizers.

BACKGROUND OF THE INVENTION

Biological wastes, such as manure, leftover food, slaughter remains, decomposed plants, and organic wastes are generally used after composting as organic fertilizers. Composting involves aerobic decomposition of the biological wastes to obtain the organic fertilizers which may be directly used for enrichment of soil. However, the composting process for treatment of the biological wastes takes longer duration and foul odors are also produced from the biological wastes. Further, the organic fertilizers obtained after the decomposition of the biological wastes include a low percentage of nutrients initially present in the biological wastes. A large percentage of the nutrients present in the biological wastes are destroyed during the composting process.

Further, other known commercial techniques are also used for treating the biological wastes. However, these techniques are not economical and require specialized machines and equipments for performing the treatment process.

There is therefore a need for effectively treating the biological wastes so that useful products, such as fertilizers are obtained in less duration without producing foul odors. Further, there is a need of incorporating economical method and system for extracting a large percentage of nutrients from the biological wastes.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
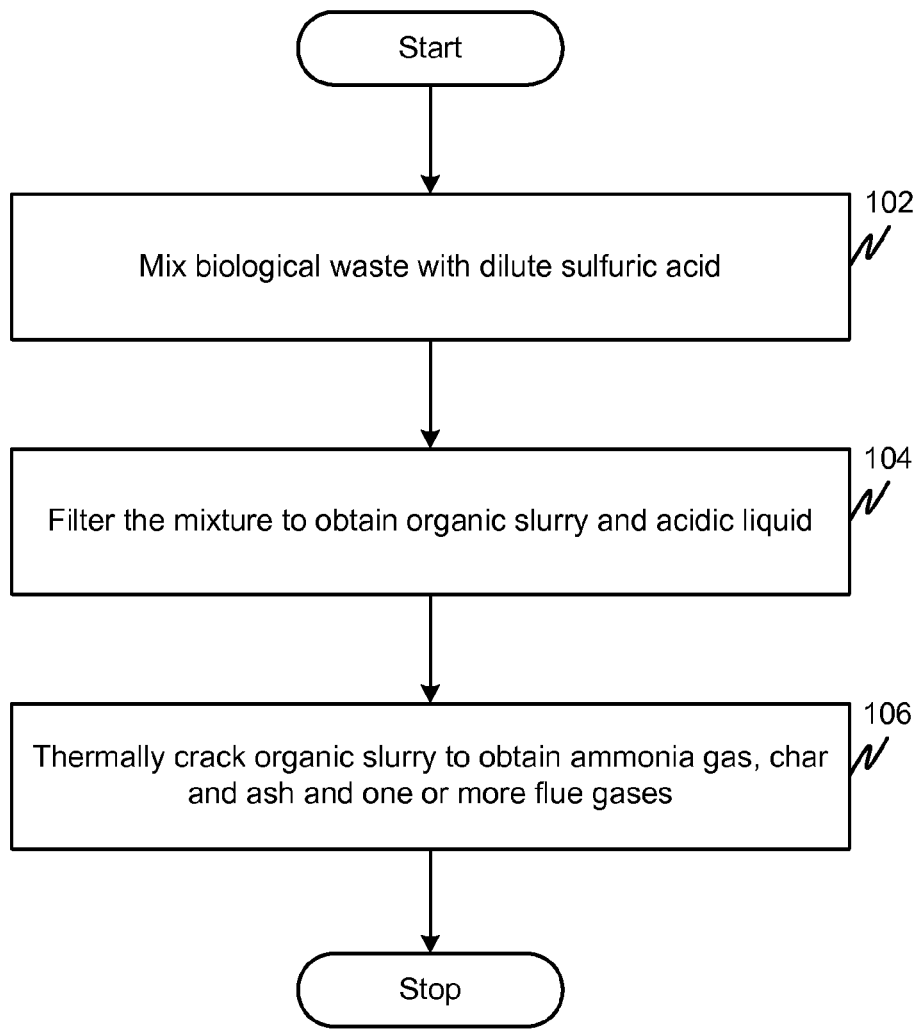
FIG. 1 illustrates a flow diagram for treating biological wastes in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the present invention, it should be observed that the embodiments reside primarily in combinations of method steps and components related to treatment of biological wastes. Accordingly, the components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides a method and system for treatment of biological wastes for preparation of fertilizers. The method involves mixing a biological waste with a dilute sulfuric acid in a predetermined ratio. The mixture of the biological waste and the dilute sulfuric acid is then filtered to obtain an organic slurry and an acidic liquid. Thereafter, the organic slurry is thermally cracked at an elevated temperature to obtain at least one of an ammonia gas, one or more flue gases, and char and ash. Thereafter, the ammonia gas, the char and ash, and the acidic liquid are utilized for preparation of the fertilizers.

FIG. 1 illustrates a flow diagram for treating biological wastes in accordance with various embodiments of the invention. Examples of the biological wastes include, but are not limited to manure, slaughter remains, animal wastes, decomposed plants, waste food, and organic wastes. Such biological wastes include one or more nutrients such as, nitrogen, phosphor, potassium, iron, and copper.

In order to treat biological waste for preparing the fertilizers, at step 102, the biological waste is mixed with a dilute sulfuric acid. In an embodiment, the dilute sulfuric acid is maintained at a PH of 3. The dilute sulfuric acid is mixed with the biological waste in a predetermined ratio. For example, six parts of a dilute sulfuric acid may be mixed with one part of a biological waste. However, the dilute sulfuric acid and the biological waste may be mixed together at any other predetermined ratio to attain a desired viscosity of the mixture. In an embodiment, the dilute sulfuric acid and the biological waste may be mixed together in a mixing chamber by stirring the mixture for a predetermined duration. The predetermined duration may be at least half an hour. The dilute sulfuric acid and the biological waste may be stirred to form the mixture. By stirring the dilute sulfuric acid and the biological waste, a large percentage of in-organic nutrients present in the biological waste are dissolved. The mixing process also supports dissolving of water from hydrocarbons present in the biological waste.

In an embodiment, biological wastes rich in urea and uric acid, such as poultry manure may be mixed with boiling water, prior to mixing the biological waste with the dilute sulfuric acid. Such biological waste is mixed with the boiling water by stirring the mixture of the biological waste and the boiling water for at least half an hour. Mixing of the biological waste and the boiling water is performed to extract nitrogen compounds from the biological waste. Thereafter, the boiling water is removed from the biological waste and the step of mixing of the biological waste with the dilute sulfuric acid is performed.

Subsequent to mixing the dilute sulfuric acid and the biological waste, the mixture is filtered, at step 104. The mixture is filtered to obtain an organic slurry and an acidic liquid. The organic slurry is the biological waste which is obtained by removing the acidic liquid from the mixture. In order to separate the acidic liquid from the mixture, the mixture is filtered using any filtering techniques known in the art. For instance, the mixture may be filtered using a gravity settling technique. In this technique, the organic slurry is allowed to settle at the bottom of a filtering unit due to gravity, thereby leaving a layer of the acidic liquid floating above the organic slurry. This layer of the acidic liquid may include some impurities. Thereafter, the acidic liquid is separated from the organic slurry. Subsequent to the gravity settling process, the filtering process may further involve a centrifuging process for extracting more acidic liquid from the organic slurry.

The organic slurry thus obtained after the filtration process may be washed with water to remove more acidic liquid from the organic slurry. Thereafter, the washed organic slurry is filtered to separate the organic slurry and an organic slurry washing liquid. The organic slurry washing liquid may be stored for further usage. The process of using the organic slurry washing liquid is explained in detail in conjunction with FIG. 2.

Further, the acidic liquid obtained after the filtration process comprises one or more nutrients. Examples of the one or more nutrients include, but are not limited to, nitrogen, phosphor, potassium, iron, and copper. The one or more nutrients are absorbed from the biological wastes while mixing the dilute sulfuric acid with the biological wastes. In order to obtain an acidic liquid which is rich in the one or more nutrients, the acidic liquid obtained after the filtration process may be mixed again with raw biological wastes for a predetermined number of times. Thus, the process of mixing the acidic liquid with the raw biological wastes and filtering such mixture as described in conjunction with step 102 and 104 may be performed for the predetermined number of times. The predetermined number of times may depend on an amount of the one or more nutrients absorbed by the acidic liquid from the raw biological wastes during each instance when the acidic liquid is mixed with the raw biological wastes. For example, an acidic liquid obtained by filtering the mixture of a biological waste and a dilute sulfuric acid may be mixed with raw biological waste and then filtered for multiple times.

In an exemplary embodiment, step 102 and step 104 may be performed in following manner. Equal quantities of a biological waste are kept in three containers, such as, container 1, container 2 and container 3. Thereafter, dilute sulfuric acid is mixed with the biological waste present in the container 1 in a ratio of six parts of the dilute sulfuric acid to one part of the biological waste. The mixture of the dilute sulfuric acid and the biological waste may have a PH level of 1. The mixture is then stirred for half an hour. Thereafter, an acidic liquid in the mixture is filtered and transferred to the container 2, leaving behind an organic slurry in container 1. The organic slurry in the container 1 is then washed with water to remove more acidic liquid from the organic slurry. The organic slurry in the container 1 is then washed by adding water to the container 1 in a ratio of five parts of water to one part of the biological waste, with the organic slurry. The water and the organic slurry in the container 1 are then stirred for half an hour. At the same time, the mixture of the acidic liquid and the biological waste in the container 2 are stirred for half an hour. Thereafter, the acidic liquid from the container 2 is filtered and transferred to the container 3. Similarly, the organic slurry washing liquid in the container 1 is filtered and transferred to the container 2, leaving the organic slurry in the container 1. The process of mixing the acidic liquid obtained from container 2 and the biological waste by stirring for half an hour is repeated in the container 3.

Thereafter, the acidic liquid is filtered and removed from the container 3. This acidic liquid may be stored in a storage tank for further usage. The process of using the acidic liquid is explained in detail in conjunction with FIG. 2. The acidic liquid thus obtained may be rich in the one or more nutrients absorbed from the biological waste. In a scenario, the acidic liquid may absorb about 50% of nitrogen in the biological waste, and a large percentage of other nutrients, such as phosphor, potassium, iron, and copper. Whereas, the organic slurry in the container 1 may include about 50% of nitrogen initially present in the biological waste and a low percentage of the other nutrients. The organic slurry may be dried for further processing. The organic slurry may be dried to obtain a solid form of the organic slurry. The solid form of the organic slurry is then further processed for treating the soil. Alternatively, the solid form of the organic slurry may be utilized for treating the soil without further processing.

Thereafter, more raw biological waste may be added into the container 1 and the process of transferring of acidic liquids between the container 1, the container 2, and the container 3 may be continued in a cyclic manner, as explained above in the exemplary embodiment, in order to obtain the organic slurry and the acidic liquid.

Now referring back to the organic slurry obtained after filtering the mixture of the biological waste and the dilute sulfuric acid, the organic slurry is thermally cracked, at step 106. The organic slurry may be thermally cracked at an elevated temperature, such as 900 deg C. The temperature may depend on a type of the biological waste that may be used to obtain the organic slurry. Further, time consumed for performing the thermal cracking of the organic slurry may also be based on the type of the biological waste. For example, thermal cracking of the organic slurry may be performed for one hour.

For performing the thermal cracking process, various known heating sources may be used, such as solar thermal energy. When the organic slurry is thermally cracked ammonia gas, one or more flue gases, and char and ash are obtained. The ammonia gas is released at the elevated temperature during the thermal cracking of the organic slurry. Further, different flue gases of the one or more flue gases may be released from the organic slurry at various temperature levels during the thermal cracking process. The one or more flue gases may include for example, but not limited to, gases associated with volatile fatty acids, methane, carbon monoxide, and other hydrocarbon gases.

Once the ammonia gas and the one or more flue gases are released, a portion of the organic slurry that remains is char and ash. The char and ash may be composed of different compositions based on the type of biological waste that is used for obtaining the organic slurry. For example, the char and ash may include carbon, metallic hydroxide, and silica. The weight of the char and ash is less as compared to the weight of the organic slurry initially taken for the thermal cracking process. For example, the char and ash may be 25% by weight of the organic slurry initially taken for performing the thermal cracking.

In an embodiment, the thermal cracking is performed in a closed chamber which includes a venting pipe. The closed chamber is used for holding the organic slurry and the venting pipe is used for releasing the ammonia gas and the one or more flue gases.

Further, in an embodiment, small quantities of one or more other bi-products may also be obtained during the thermal cracking of the organic slurry. The one or more other bi-products may include, but are not limited to volatile fatty acids, hydrocarbons and tars. The one or more other bi-products form a layer above a layer of the char and ash after the thermal cracking process. This layer of the one or more other bi-products may be removed and disposed easily. Further, the one or more bi-products may be utilized as liquid fuels.

In an embodiment, the thermal cracking process and the filtering process facilitate in extraction of various compounds from the biological waste such as, a nitric compound, a phosphoric compound, a sulfuric compound, and non-combustible metallic salts. Further, moisture and the one or more bi-products are removed from the ammonia gas and the char and ash. Therefore, production of corrosive flue gases and harmful flue gases does not take place. However, direct combustion of the organic slurry obtained from the biological waste, instead of the thermal cracking process may result in formation of the corrosive flue gases and harmful flue gases, due to improper combustion of the organic slurry. Therefore, the thermal cracking process and the filtering process facilitate efficient treatment of the biological wastes to obtain the ammonia gas and the char and ash.

Once the ammonia gas and the char and ash are obtained from the organic slurry, treatment of the ammonia gas and the char and ash is performed. The ammonia gas and the char and ash are treated utilizing the acidic liquid to prepare fertilizers. The process of treating the ammonia gas and the char and ash is explained in detail in conjunction with FIG. 2 and FIG. 3 respectively. Apart from preparing the fertilizers, the ammonia gas and the char and ash may be utilized for other purposes also. For example, the char and ash may be directly used as charcoal. Alternatively, the char and ash may be processed using a solar treatment process into a liquid or gaseous fuel by treating the char and ash with calcium, water, or carbon dioxide. Further, the char may also be used as a green house plant growth media.

Figure 2:
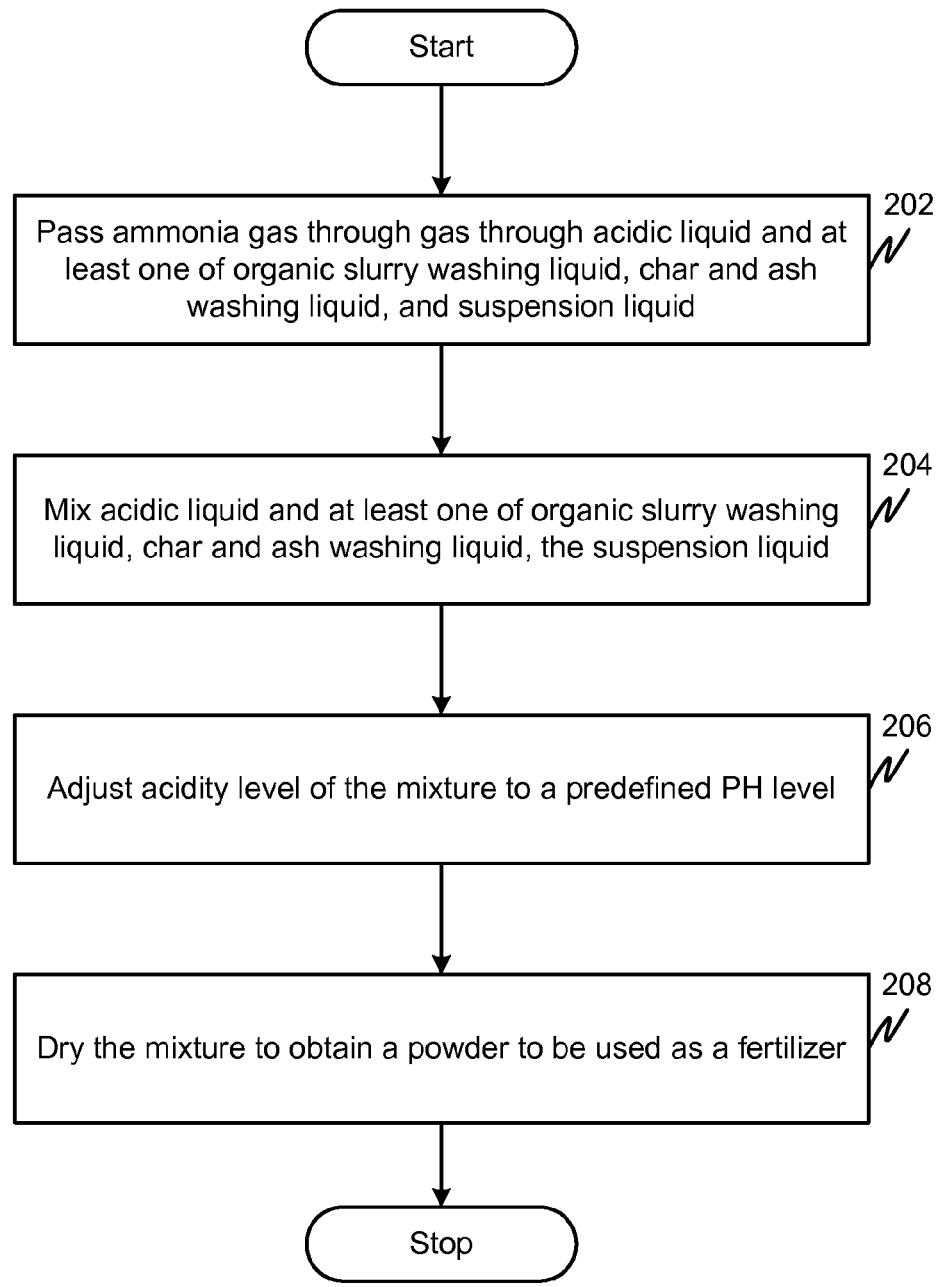
FIG. 2 illustrates a flow diagram for treating ammonia gas in accordance with an embodiment of the invention.

FIG. 2 illustrates a flow diagram for treating the ammonia gas in accordance with an embodiment of the invention. As discussed in detail in conjunction with FIG. 1, the ammonia gas is obtained after thermally cracking the organic slurry. The ammonia gas is then treated for preparing fertilizers.

At step 202, the ammonia gas is passed through the acidic liquid and at least one of an organic slurry washing liquid, a char and ash washing liquid, and a suspension liquid. In an embodiment, the ammonia gas may be passed through the acidic liquid and at least one of the organic slurry washing liquid, the char and ash washing liquid, and the suspension liquid one after the other. For example, the ammonia gas may be initially passed through the acidic liquid. While passing the ammonia gas through the acidic liquid, ammonia in the ammonia gas is converted into ammonium sulfate. The acidic liquid may act as an alkaline extraction liquid and performs following reaction with the ammonia gas: $2\,NH_3 + H_2SO_4 \rightarrow (NH_4)_2SO_4$. The reaction may be performed at a temperature of about 60 deg. C.

Thereafter, the ammonia gas is passed through at least one of the organic slurry washing liquid, the char and ash washing liquid, and the suspension liquid. The organic slurry washing liquid is obtained after washing the organic slurry with water, as explained in detail in conjunction with FIG. 1. Similarly, the char and ash washing liquid is obtained by washing the char and ash with a washing liquid. The process of obtaining the char and ash washing liquid is explained in detail in conjunction with FIG. 3. The suspension liquid includes water and lime. In an embodiment, the ammonia gas may be passed through each of the organic slurry washing liquid, the char and ash washing liquid, and the suspension liquid, consecutively. While passing the ammonia gas through the organic slurry washing liquid, the char and ash washing liquid, and the suspension liquid, the ammonia present in the ammonia gas and is absorbed and remaining one or more flue gases may be released in air. As no combustion is performed, the one or more flue gases may be cooled down so that the one or more flue gases do not combine to form toxic gases.

Subsequent to absorption of ammonia from the ammonia gas, at step 204, the acidic liquid and the at least one of the organic slurry washing liquid, the char and ash washing liquid, and the suspension liquid through which the ammonia gas is passed, are mixed together. This mixing process is performed to collect the one or more nutrients extracted from the biological waste by the acidic liquid, the organic slurry washing liquid, the char and ash washing liquid, and the suspension liquid.

Thereafter, an acidity level of the mixture of the acidic liquid and the at least one of the organic slurry washing liquid, the char and ash washing liquid, and the suspension liquid is adjusted, at step 206. In an embodiment, the acidity level of the mixture is adjusted to a predefined PH level. The predefined PH level is defined based on a type of fertilizer that needs to be prepared. The acidity level may be adjusted by utilizing sulfuric acid and calcium hydroxide. For example, in case the acidity level is to be increased, the sulfuric acid is added to the mixture. Alternately, if the acidity level is to be decreased, calcium hydroxide is added to the mixture. However, it will be apparent to a person skilled in the art other acids and bases know in the art may be used for adjusting the acidity level of the mixture.

Thereafter, the mixture of the acidic liquid and the at least one of the organic slurry washing liquid, the char and ash washing liquid, and the suspension liquid is dried, at step 208. The mixture may be dried using various drying techniques known in the art. The mixture may be dried to obtain a powder that is used as the fertilizer.

Figure 3:
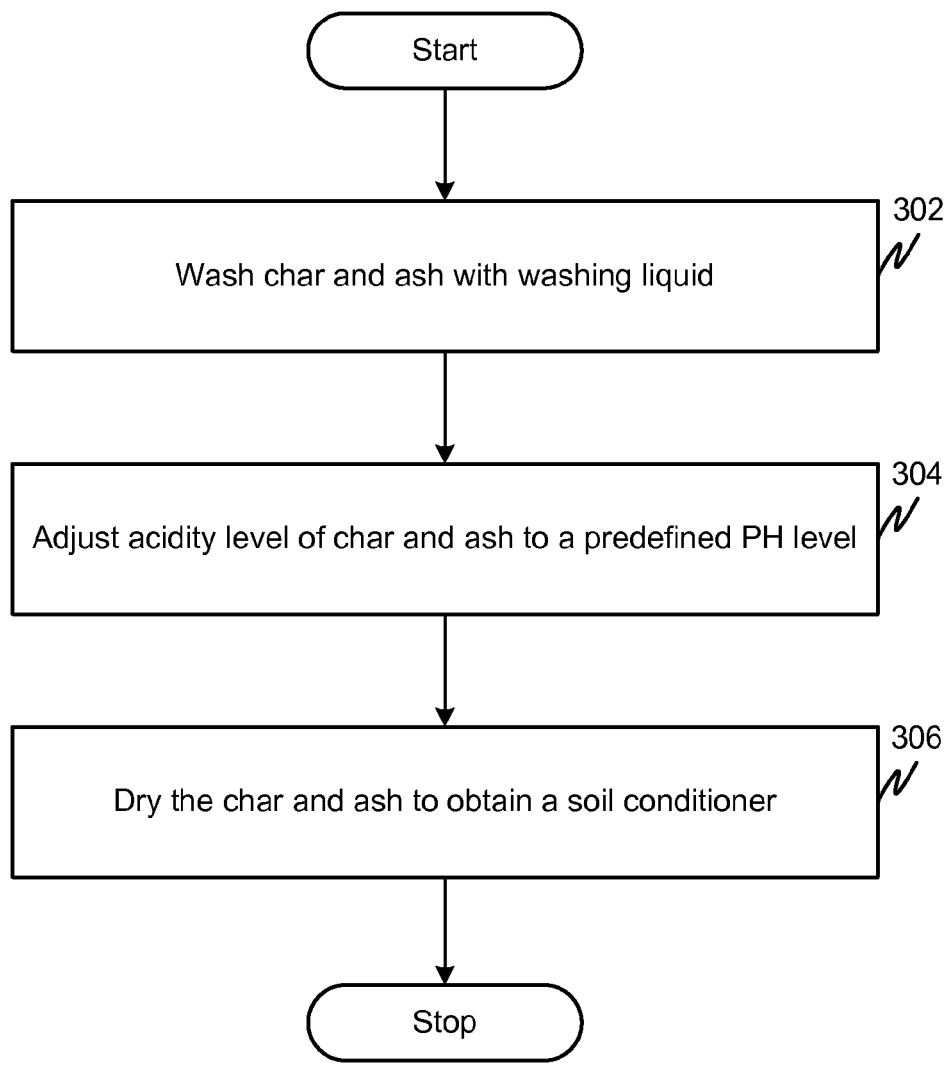
FIG. 3 illustrates a flow diagram for treating char and ash in accordance with an embodiment of the invention.

FIG. 3 illustrates a flow diagram for treating the char and ash in accordance with an embodiment of the invention. As discussed in detail in conjunction with FIG. 1, the char and ash is obtained after thermally cracking the organic slurry. The char and ash is then treated for the preparation of fertilizers, such as a soil conditioner.

At step 302, the char and ash is washed with a washing liquid. The washing liquid includes water and sulfuric acid. The washing liquid may have a PH level greater than 9. Thereafter, the washing liquid is removed from the char and ash.

Upon washing, at step 304, an acidity level of the char and ash is adjusted to a predefined PH level. The predefined PH level is defined based on a type of soil conditioner that needs to be prepared. The acidity level may be adjusted by utilizing sulfuric acid and calcium hydroxide. For example, in case the acidity level is to be increased, the sulfuric acid is added to the char and ash. Alternately, if the acidity level is to be decreased, calcium hydroxide is added to the char and ash. However, it will be apparent to a person skilled in the art that other acids and bases known in the art may be used for adjusting the acidity level of the char and ash.

Thereafter, the char and ash is dried at step 306. The char and ash is dried using various drying techniques known in the art. The char and ash in a dried form is used as the soil conditioner. As a soil condition, the char and ash enables the soil to retain water and nutrients. Further, the char and ash also helps in decomposition of micro-organisms, and growth and digestion of organic matter.

Figure 4:
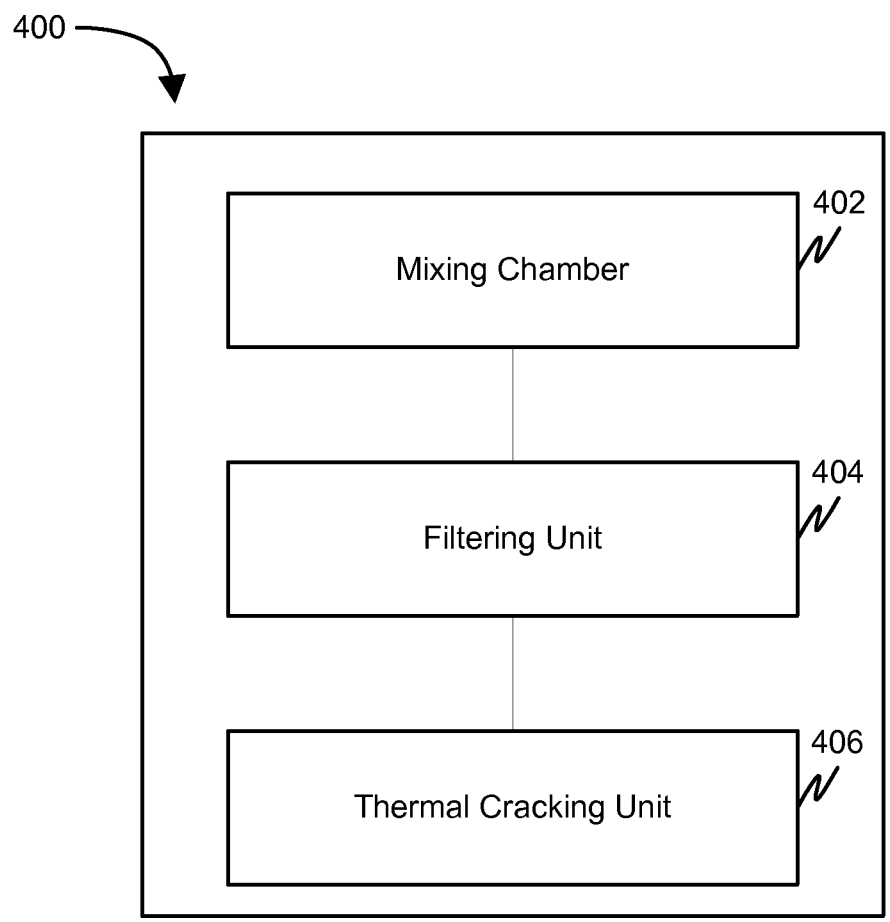
FIG. 4 illustrates a block diagram of a system for treating biological wastes in accordance with an embodiment of the invention.

FIG. 4 illustrates a block diagram of a system 400 for treating a biological waste in accordance with an embodiment of the invention. System 400 includes a mixing chamber 402, a filtering unit 404, and a thermal cracking unit 406.

Mixing chamber 402 is utilized for mixing the biological waste and a dilute sulfuric acid. The dilute sulfuric acid is mixed with the biological waste in a predetermined ratio in mixing chamber 402. Further, mixing of the biological waste and the dilute sulfuric acid may involve stirring the mixture in mixing chamber 402 for a predetermined duration. The predetermined duration may be for at least half an hour. Mixing chamber 402 may be a container in which the biological waste and the dilute sulfuric acid are mixed and stirred manually. Alternatively, mixing chamber 402 may be a container with an automatic stirring mechanism for stirring the mixture of the biological waste and the dilute sulfuric acid. Mixing chamber 402 may be composed of a corrosion resisting material so that the dilute sulfuric acid does not causes corrosion to mixing chamber 402.

After mixing the biological waste and the dilute sulfuric acid in mixing chamber 402, the mixture is filtered in filtering unit 404. Filtering unit 404 filters the mixture to obtain an organic slurry and an acidic liquid. Any filtering device known in the art may be used as filtering unit 404. For instance, filtering unit 404 may include a gravity settling unit. The gravity settling unit enables settling of the organic slurry at the bottom of a chamber of the gravity settling unit, due to gravity. As a result, a layer of the acidic liquid is formed that floats above the organic slurry. The acidic liquid is removed from the organic slurry. Filtering unit 404 may also include a centrifuging unit to extract more acidic liquid from the organic slurry. Filtering unit 404 is prepared from a corrosion resisting material so that the acidic liquid does not causes corrosion to filtering unit 404.

Subsequent to filtering of the acidic liquid from the organic slurry in filtering unit 404, the organic slurry is thermally cracked in thermal cracking unit 406. Thermal cracking unit 406 performs the thermal cracking process in order to obtain ammonia gas, one or more flue gases, and char and ash from the organic slurry. Thermal cracking unit 406 may perform the thermal cracking of the organic slurry at an elevated temperature, such as, 900 deg C. Various thermal cracking devices, known in the art may be used as thermal cracking unit 406. In an embodiment, thermal cracking unit 406 includes a closed chamber (not shown in FIG. 4) for holding the organic slurry. The closed chamber further includes a venting pipe for releasing the ammonia gas and the one or more flue gases. Thermal cracking unit 406 also includes a heat source for heating the organic slurry held in the closed chamber. Various heat sources, known in the art may be used for heating to perform the thermal cracking process, such as solar thermal energy. As thermal cracking of the organic slurry is performed in thermal cracking unit 406, the ammonia gas and the char and ash are obtained from the organic slurry. The ammonia gas and the char and are then treated by utilizing the acidic liquid to obtain fertilizers. Treatment of the ammonia gas and the char and ash is explained in detail in conjunction with FIG. 2 and FIG. 3 respectively.

Various embodiments of the invention provide a method and system for treating the biological wastes for preparation of fertilizers. The method and system enables treating the biological wastes utilizing sulfuric acid. As the sulfuric acid is cheaply and abundantly available, treatment of the biological wastes may be performed at any location. Further, in order to extract nutrients from the biological wastes, thermal cracking is performed. Therefore, effective extraction of the nutrients is performed without producing harmful combustive gases. The method and system enables utilization of every bi-products that are obtained in the process of treatment of the biological wastes for preparation of fertilizers. Moreover, the treatment of biological wastes is performed in lesser duration as compared to composting of the biological waste. Further, no foul odors are produced during the treatment of the biological wastes. Therefore, an efficient and economical method and system is provided for treating the biological wastes for the preparation of the fertilizers.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of treating biological waste for preparation of fertilizers, the method comprising:
   mixing the biological waste with a dilute sulfuric acid in a predetermined ratio;
   filtering the mixture of the biological waste and the dilute sulfuric acid to obtain an organic slurry and an acidic liquid; and
   thermally cracking the organic slurry at an elevated temperature to obtain at least one of an ammonia gas, at least one flue gas, and char and ash, wherein the ammonia gas, the acidic liquid and the char and ash are used for preparation of the fertilizers;
   passing the ammonia gas through the acidic liquid and at least one of an organic slurry washing liquid, a char and ash washing liquid, and a suspension liquid, wherein the organic slurry washing liquid is obtained by washing the organic slurry with water, wherein the char and ash washing liquid is obtained by washing the char and ash with a washing liquid, and the suspension liquid comprises water and lime; and
   drying a mixture of the acidic liquid and a liquid selected from the group consisting of the organic slurry washing liquid, the char and ash washing liquid, and the suspension liquid to obtain a powder, wherein the powder is used as a fertilizer.

2. The method of claim 1, wherein the predetermined ratio is six parts of the dilute sulfuric acid to one part of the biological waste.

3. The method of claim 1, wherein the mixing of the biological waste with the dilute sulfuric acid comprises stirring the mixture for a predefined duration, wherein the predefined duration is at least half an hour.

4. The method of claim 1, wherein the elevated temperature is about 900° C.

5. The method of claim 1, wherein the organic slurry is thermally cracked in a closed chamber, the closed chamber comprises a venting pipe.

6. The method of claim 5, wherein the ammonia gas and the at least one flue gas is released from the venting pipe of the closed chamber, in response to the thermally cracking of the organic slurry.

7. The method of claim 6, further comprising mixing the acidic liquid and at least one of the organic slurry washing liquid, the char and ash washing liquid, and the suspension liquid.

8. The method of claim 7, further comprising adjusting an acidity level of the mixture of the acidic liquid and at least one of the organic slurry washing liquid, the char and ash washing liquid, and the suspension liquid to a predefined PH level.

9. The method of claim 1, wherein the acidic liquid comprises at least one nutrient, wherein the at least one nutrient is absorbed from the biological waste present in the acidic liquid.

10. The method of claim 9, wherein the at least one nutrient is selected from the group consisting of nitrogen, phosphorous, potassium, iron, and copper.

11. The method of claim 10 further comprising mixing the acidic liquid with a raw biological waste for a predetermined number of times, wherein the predetermined number of times is based on an amount of the at least one nutrient absorbed from the raw biological waste by the acidic liquid.

* * * * *